United States Patent [19]

Michellone et al.

[11] 3,717,385
[45] Feb. 20, 1973

[54] ANTI-SKID BRAKING SYSTEMS

[75] Inventors: Giancarlo Michellone; Mario Palazzetti, both of Turin, Italy

[73] Assignee: Fiat Societa per Azioni, Turin, Italy

[22] Filed: Jan. 12, 1971

[21] Appl. No.: 105,867

[30] Foreign Application Priority Data

Jan. 15, 1970 Italy..................67109-A/70

[52] U.S. Cl................................303/21 F
[51] Int. Cl................................B60t 8/10
[58] Field of Search............303/21 F, 61; 188/181 A

[56] References Cited

UNITED STATES PATENTS 3,552,802 1/1971 Packer et al...................303/61 X

Primary Examiner—Evon C. Blunk
Assistant Examiner—W. Scott Carson
Attorney—Sughrue, Rothwell, Mion, Zinn & Macpeak

[57] ABSTRACT

Anti-skid braking of a vehicle wheel is effected by periodical release of the braking pressure with a substantially instantaneous drop if the vehicle is moving on a ground with a low grip coefficient (ice, mud) while the release is effected with a substantially instantaneous drop by a fixed decrement followed by a gradual drop if the vehicle is moving on a ground with a high grip coefficient (firm dry surface).

6 Claims, 4 Drawing Figures

ANTI-SKID BRAKING SYSTEMS

This invention relates to a method of and apparatus for anti-skid braking of a vehicle. In anti-skid braking, the braking pressure is automatically released when the wheel enters an incipient locking condition, and is resumed when the conditions are again safe. This periodical release and resumption takes place independently of the force applied by the driver to the brake pedal.

A fundamental problem of anti-skid braking is the difficulty of obtaining satisfactory behavior of the braking system on different kinds of ground. In particular, braking methods which provide satisfactory performance on dry ground often fail to perform satisfactorily on very slippery ground, for instance on ice or on surfaces covered with mud. Conversely, behavior which is satisfactory on very slippery ground is not satisfactory on dry ground.

On slippery ground, in fact, the braking pressure at which the command to discharge the pressure on the brakes is given has a relatively low value, necessitating complete discharge of the pressure during the release phase of the cycle.

On dry ground, on the other hand, where the braking pressure can rise safely to higher values, it is more appropriate that the braking pressure should vary about a relatively high mean value. If the braking pressure is completely discharged, the vehicle is subjected to great variations in the braking force, with the result that the structure of the vehicle is subjected to excessive stresses, the comfort of the passengers is impaired, the braking and release operations have dangerous effects on the steering, and the vehicle stopping distance is lengthened.

The object of the present invention therefore consists in providing a method of anti-skid braking which is capable of operating so as to give equally satisfactory performance both on dry ground and on slippery ground in every case avoiding excessive stresses on the structure of the vehicle, in order to maintain an adequate comfort of the passengers and stability and steering safety of the vehicle.

The invention also provides an anti-skid braking apparatus for carrying the aforesaid method into effect.

The invention achieves the above and other objects by a method for the anti-skid of a vehicle wheel, in which the braking force is decreased and increased repeatedly during a braking operation in accordance with the dynamic condition of the wheel, characterized in that while the wheel is in an incipient locking condition, if the peak value of the braking force is below a threshold, the braking force is decreased in a single phase at a substantially instantaneous rate, and, if the peak value of the braking force is above a threshold, the braking force is decreased in two phases, a first phase at a substantially instantaneous rate and a second phase at a comparatively gradual rate.

The invention also provides an apparatus for the anti-skid braking of a vehicle wheel, including a source fluid pressure, a brake cylinder, a tube connecting the source to the brake cylinder discharge means connected to the brake cylinder and an antiskid apparatus connected in the tube and responsive to the dynamic condition of the wheel for repeatedly causing discharge of pressure from the brake cylinder during a braking operation, characterized in that the apparatus further includes means connected to the discharge means and responsive to the peak value of the braking pressure for discharging the braking pressure in a single phase if the peak value is below a threshold and for discharging the braking pressure in two phases, in a first phase at a substantially instantaneous rate and in a second phase at a comparatively gradual rate, if the peak value is above a threshold.

In accordance with the invention, in a braking operation a braking pressure applied in a brake cylinder increases up to a maximum value at which a command for release or discharge of the pressure on the brakes is given if called for by the dynamic state (retardation or slipping) of the wheel. This maximum value of the pressure determines which one of two modes or forms of discharge of the pressure will be used, for as long as the wheel remains in an incipient locking condition. If the maximum pressure is greater than a predetermined threshold value, the discharge of the pressure takes place first almost instantaneously and later more gradually. If on the other hand, the maximum pressure is less than the threshold value, the discharge of the pressure takes place substantially instantaneously, usually until the pressure is substantially zero. A command for resumption of the braking pressure is given when this is permitted by the dynamic state of the wheel. Release and resumption may take place in accordance with any suitable anti-skid methods.

Figure 1:
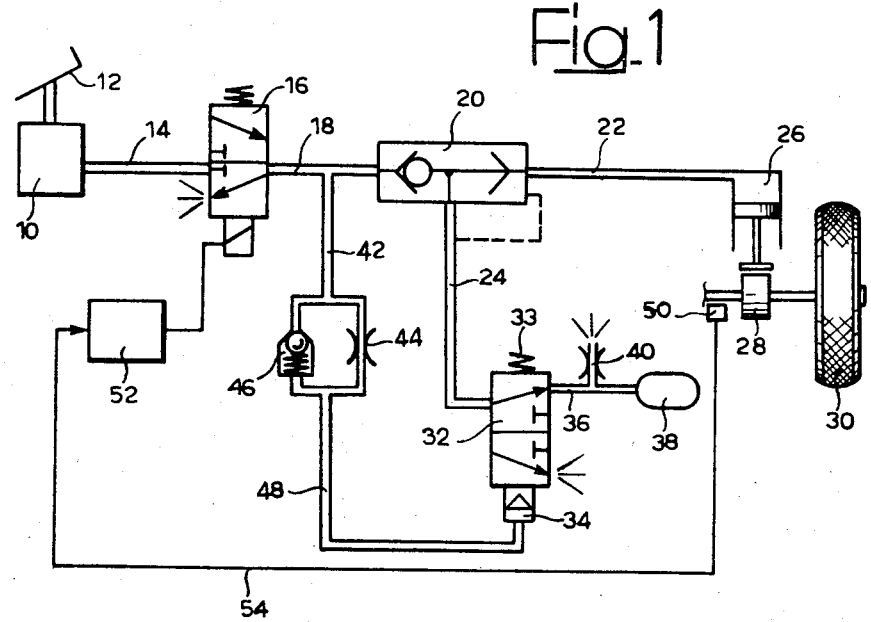
FIG. 1 is a schematic diagram of a braking apparatus according to the invention.

A preferred embodiment of a pneumatic anti-skid braking system of the invention is seen schematically in FIG. 1.

A pneumatic pressure source 10 is controlled by a vehicle brake pedal 12 to supply a variable pressure to a tube 14, which leads to an inlet port of a three-port two-position solenoid operated valve 16. The valve 16 normally connects the tube 14 to a tube 18, while when operated by its solenoid, connects the tube 18 to atmosphere, closing the tube 14. The tube 18 leads to an inlet port of a known quick discharge valve 20 which has an outlet connected to a tube 22. The valve 20 has a free passage between the tubes 18 and 22 when the tube 18 is pressurized, while, when pressure is removed from tube 18, discharges the pressure in the tube 22 to a tube 24.

The tube 22 leads to a brake cylinder 26, which is adapted to brake a wheel 30 by acting on a brake 28.

The tube 24 leads to an inlet port of a known pressure operated selector valve 32 having one inlet and two outlets. The selector valve 32 is spring-biased to normally connect the tube 24 to atmosphere. When actuated by the existence in a control port 34 of a pressure exceeding a predetermined threshold, the valve 32 connects the tube 24 to a tube 36. The tube 36 leads both to an absorber 38 and through a restriction 40 to atmosphere. The threshold can be adjusted by adjusting a spring 33.

A tube 42 leads from a point on the tube 18 to a restrictor 44 which is by-passed by a check valve 46. A tube 48 leads from the components 44,46 to the control port 34 of the selector valve 32.

A tachometer 50 provides an anti-skid device 52 of any suitable kind with a wheel speed signal through a line 54. When the dynamic state of the wheel 30 so requires, the anti-skid device 52 supplies signal to the solenoid of the valve 16 to move the valve to its alternative position for the exhaust of the pressure to atmosphere.

A suitable embodiment of an anti-skid device is described in the copending U.S. Pat. application Ser. No. 103,092, filed Dec. 31, 1970.

Figure 2:
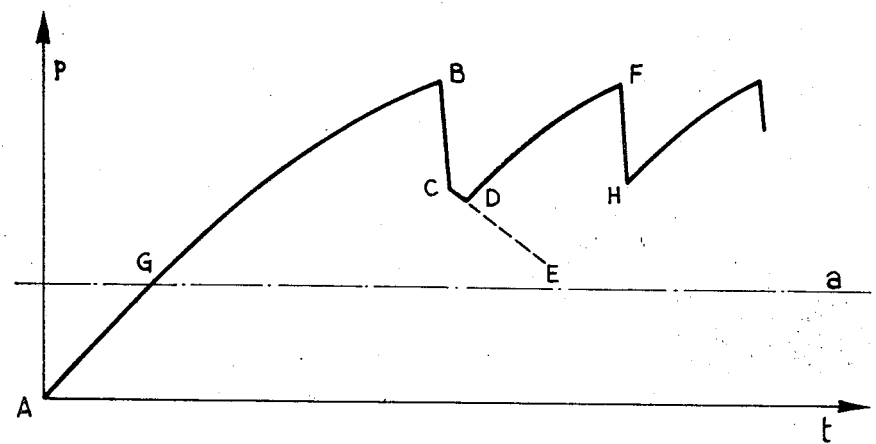
FIG. 2, FIG. 3 and FIG. 4 are graphs showing in idealized form the variation of the braking pressure as a function of time during a braking operation on dry ground (FIG. 2), on slippery ground (FIG. 3) and in an intermediate situation (FIG. 4).
Figure 3:
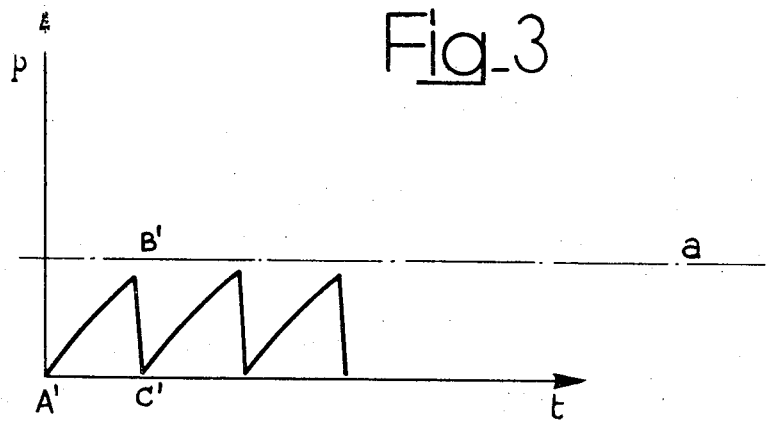
Figure 4:
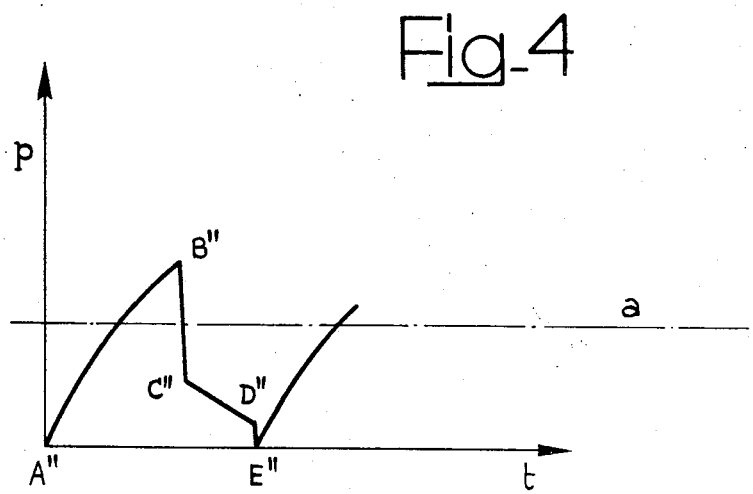

When the pedal 12 is depressed, pressure is applied to the brake cylinder 26 through tube 14, valve 16, tube 18, valve 20 and tube 22 the pressure rises in the brake cylinder according to the curve sections A–B, or A'–B' or A''–B'' of FIGS. 2,3 and 4 respectively. These three figures as regards the maximum value of the braking pressure and the variation of the braking pressure in the released section of the curve, as will be explained below. Pressure is also supplied to the control port 34 of the selector valve 32 through the tube 42, check valve 46 and tube 48. (The delivery of the restrictor 44 is negligible compared to that of the check valve 46, in this direction of flow).

If the pressure in the tube 18 exceeds a threshold, predetermined as a discriminating value of the braking pressure between ground with a high grip coefficient and ground with a low grip coefficient, the selector valve 32 is moved from its position of direct discharge to atmosphere to its position of discharge to the absorber 38 and the restrictor 40.

No pressure exists in the tube 24 at this stage.

Now assume that because of braking, the wheel is brought into an incipient locking condition. The anti-skid device 52 then senses this condition and operates the valve 16 to discharge the pressure in the tube 18 to atmosphere.

The behavior of the braking apparatus will now be different according to the nature of the ground upon which the vehicle is moving.

FIG. 2 shows the curve of the braking pressure with respect to time when the braking operation is effected on a ground with a high grip coefficient for instance firm, dry ground. Line *a* denotes the threshold pressure. Depression of the brake pedal causes the pressure to rise along the curve segment A–B as was said above. When the intersection G with the line *a* is passed, the selector valve 32 is set by pressure in the control port 34 to connect the tube 24 to the tube 36. At B, when the anti-skid device 52 causes the valve 16 to exhaust pressure in the tube 18 to atmosphere, the removal of pressure from tube 18 causes the quick discharge valve 20 to open a passage from the tube 22 to the tube 24 and therefore through the valve 32 to the tube 36. The gas will at first fill the absorber 38, causing the pressure in the brake cylinder 26 to fall from B to C (FIG. 2) practically instantaneously. The gas then flows through the restrictor 40 to atmosphere, thus causing the pressure in the brake cylinder 26 to fall at a slower rate along the curve segment C–E in FIG. 2.

However, at a point D, the anti-skid device 52 restores the solenoid-operated valve 16 to its normal position, thus reapplying pressure on the tube 18, and 38 causing the quick discharge valve 20 to close the tube 24 and to transmit pressure through the tube 22 to the brake cylinder 26. The pressure in the brake cylinder then rises again along the curve segment D–F.

This cycle of operation can repeat itself as often as is required by the anti-skid device 52 during a braking operation.

During each cycle of operation, the check valve 46 and the restriction 44 maintain a substantially constant pressure in the tube 48, allowing this pressure to decrease only slightly from its peak value by return flow through the restrictor 44. At each new cycle, the pressure in the tube 48 is restored, if necessary, to the peak value by the action of the check valve 46.

Although the beginning of a new cycle of operation has been shown at point D in FIG. 2, there is no telling in advance where along curve B–C–E the new cycle will begin, the actual point depending on the instant when the anti-skid device 52 restores the valve 16 to its normal position. In the second cycle illustrated in FIG. 2 the pressure is restored to the brake cylinder at point H, that is, slightly in advance of the complete filling of the absorber 38. This will be the more typical behavior on a hard dry ground, the provision of restrictor 40 to have the pressure fall slowly after the initial discharge being only a safety measure, for the case that the initial quick drop of pressure is not enough to prevent a locking of the wheel.

When, eventually, the braking operation ends with the driver removing his foot from the pedal 12, removal of the pressure from the tube 18 will cause the quick discharge valve 20 to change position and open a passage from the tube 22 to the tube 24. This causes discharge of the pressure in the cylinder 26 in the valve 32 and through the restrictor 40 to atmosphere. The restrictor 44 will allow the pressure in the tube 48 to decay slowly to zero, in preparation for the next braking operation.

FIG. 3 shows how the pressure varies when braking on slippery ground, for instance an icy road. Pressure in the brake cylinder 26 now has only risen to a point B', below the threshold *a*, when the anti-skid device 52 operates the valve 16. The valve 32 remains throughout in its position of exhaust to atmosphere since the pressure in the port 34 is insufficient to overcome the spring 33. The pressure in the brake cylinder therefore drops directly to a null value, shown by the curve segment B'C' in FIG. 3.

FIG. 4 shows an intermediate situation, such as may occur when driving from dry ground on to a patch of slippery ground. The pressure rises to a maximum value B'' above the threshold *a*. This naturally causes the pressure in the port 34 to rise to a value such as to move the valve 32 to its position in which, when the anti-skid device 52 causes the valves 16 and 20 to change position, the pressure in the brake cylinder 26 discharges through the valve 20, tube 24, valve 32 and tube 36 into the absorber 38, with slight leakage through the restrictor 40 to atmosphere. This corresponds to substantially instantaneous discharge of the braking pressure in the curve segment B''–C'' in FIG. 4. When the absorber 38 is fully charged, the pressure in it and in the brake cylinder 26 decreases comparatively slowly in the curve segment C''–D'' of FIG. 4, air meanwhile escaping to the atmosphere through the restrictor 40.

Meanwhile air in the tube 48 has been returning gradually to atmosphere through the restrictor 44 and the valve 16. When the pressure in the tube 48 and port 34 drops below the value sufficient to oppose the spring 33, the valve 32 returns to its normal position. This point is indicated at D'' in FIG. 4. The valve 32 is now open to atmosphere, and the pressure in the cylinder 26 falls sharply, as shown by the curve segment D''-E'' in FIG. 4, to a zero value.

What we claim is:

1. In a method for the anti-skid braking of a vehicle wheel, in which the braking fluid pressure is decreased and increased repeatedly during one braking operation in accordance with changes in the dynamic condition of the wheel, the improvement that, if the peak value of the braking fluid pressure is below a threshold, the braking fluid pressure may decrease to a zero value in a single phase substantially instantaneously, while, if the peak value of the braking fluid pressure is above the threshold, the braking fluid pressure may decrease toward a zero value in two phases, a first phase of a fixed decrement of pressure proportional to said peak value substantially instantaneously and a second phase at a comparatively gradual rate the extent of the fluid pressure decrease being dependent on the fluid pressure drop required to effect a change in the dynamic condition of the wheel.

2. The method of claim 1 in which, if in the two-phase pressure decrease the braking fluid pressure falls below the threshold during the first phase, the second phase may be followed by a third phase in which the pressure may decrease substantially instantaneously to a zero value.

3. In an apparatus for the anti-skid braking of a vehicle wheel, including a source of fluid pressure, a brake cylinder, a tube connecting the source to the brake cylinder, discharge means connected to the brake cylinder and an anti-skid apparatus connected in the tube and responsive to changes in the dynamic condition of the wheel for repeatedly causing a decrease and an increase in the pressure in the brake cylinder during a braking operation, the improvement that the apparatus further includes means connected to the discharge means and responsive to the peak value of the braking pressure for discharging the braking pressure substantially instantaneously in a single phase if the peak value is below a threshold, and for discharging the braking pressure in two phases, in a first phase of a fixed decrement of pressure proportional to said peak value substantially instantaneously and in a second phase at a comparatively gradual rate, if the peak value is above the threshold and the anti-skid apparatus does not increase the pressure prior to the initiation of said second phase, said means responsive to the peak value of the braking pressure including:

a. a selector valve having a control port, an inlet connected to the discharge means, a first outlet leading to exhaust and a second outlet leading to an absorber, the absorber communicating with a restrictor which leads to exhaust;
   b. pressure-retaining means having an inlet connected to a point in the tube downstream of the anti-skid apparatus, and an outlet connected to the control port of the selector valve;
   c. the selector valve connecting its inlet to its first outlet if the pressure in the control port is below the threshold, and connecting its inlet to its second outlet if the pressure in the control port is above the threshold.

4. The apparatus of claim 3, in which the pressure-retaining means includes a check valve.

5. The apparatus of claim 4, in which the pressure-retaining means includes a restrictor bypassing the check-valve.

6. The apparatus of claim 3, in which the discharge means comprise a quick discharge valve having a main passage connected in series in the line, and a discharge passage connecting the brake cylinder to the inlet of the selector valve, the main passage being open and the discharge passage being closed if the pressure in the tube upstream of the quick discharge valve is not lower than the pressure in the brake cylinder, and the main passage being closed and the discharge passage being open if such pressure upstream is lower than the pressure in the brake cylinder.

* * * * *